United States Patent
Tsai et al.

(10) Patent No.: US 11,589,020 B2
(45) Date of Patent: Feb. 21, 2023

(54) PARAMETER ADJUSTING METHOD AND PROJECTOR

(71) Applicant: BENQ CORPORATION, Taipei (TW)

(72) Inventors: Hung-Chi Tsai, New Taipei (TW); Chen-Cheng Huang, Taipei (TW)

(73) Assignee: BenQ Corporation, Taipei (TW)

( * ) Notice: Subject to any disclaimer, the term of this patent is extended or adjusted under 35 U.S.C. 154(b) by 21 days.

(21) Appl. No.: 17/412,284

(22) Filed: Aug. 26, 2021

(65) Prior Publication Data
US 2023/0025690 A1 Jan. 26, 2023

(30) Foreign Application Priority Data
Jul. 14, 2021 (CN) .......................... 202110793061.8

(51) Int. Cl.
*H04N 9/31* (2006.01)
*G03B 21/28* (2006.01)
*G01J 1/42* (2006.01)

(52) U.S. Cl.
CPC ........... *H04N 9/3182* (2013.01); *G03B 21/28* (2013.01); *H04N 9/3155* (2013.01); *H04N 9/3194* (2013.01); *G01J 1/4204* (2013.01)

(58) Field of Classification Search
CPC .... G03B 21/008; G03B 21/28; G03B 21/145; G03B 21/147; G03B 21/208; G03B 21/2053; G03B 21/2066; G01J 1/4204; G01J 21/429; G01J 2001/4242; G01J 2001/4276; H04N 9/12; H04N 9/315; H04N 9/3102; H04N 9/3105; H04N 9/3108; H04N 9/3155; H04N 9/3182; H04N 9/3194; G09G 3/001; G09G 3/002; G09G 3/346; G09G 3/2014
See application file for complete search history.

(56) References Cited

U.S. PATENT DOCUMENTS

| | | | |
|---|---|---|---|
| 8,520,149 B2 * | 8/2013 | Allen | H04N 9/3197 353/121 |
| 10,699,611 B2 | 6/2020 | Wu | |
| 2008/0043297 A1 * | 2/2008 | Shiu | H04N 21/485 358/509 |
| 2020/0358991 A1 * | 11/2020 | Chien | H04N 9/3185 |

FOREIGN PATENT DOCUMENTS

| | | |
|---|---|---|
| CN | 109343299 A | 2/2019 |
| TW | 201401875 A | 1/2014 |

* cited by examiner

*Primary Examiner* — Sultan Chowdhury

(57) ABSTRACT

A parameter adjusting method is applied to a projector having an ambient light sensor, a database and a digital micromirror device. The parameter adjusting method includes analyzing a detection signal generated by the ambient light sensor to acquire an environmental light datum, comparing the environmental light datum with a lookup table of the database to compute at least one compensation parameter, and adjusting an amount of reflection light generated by the digital micromirror device in accordance with the at least one compensation parameter for controlling the projector to output a calibrated projection image in response to compensation of the environmental light datum.

20 Claims, 4 Drawing Sheets

PARAMETER ADJUSTING METHOD AND PROJECTOR

BACKGROUND OF THE INVENTION

1. Field of the Invention

The present invention relates to a parameter adjusting method and a projector, and more particularly, to a parameter adjusting method and the projector capable of automatically calibrating a projection image according to an environmental light datum.

2. Description of the Prior Art

Generally, a projector is applied for conference, advertisement and/or exhibition, and utilizes a lens system to provide a wide projection image. The projector provides the original color performance in a dark background; if the projector is operated in an illuminated background, the projection image is affected by environmental light and has drawbacks of color paling and detail blurring. The environmental light may be decreased for overcoming the drawbacks, but the environmental light is difficult to reduce as the dark background. Another solution may increase an intensity of the light source of the projector, but energy consumption, a machine temperature, a fan speed, operation noise and manufacturing cost are increased accordingly. Besides, intensity variation of the light source has low linearity, so that color variation of the projection image cannot be computed and predicted when the intensity of the light source is increased; transformation between the color variation and the increased intensity of the light source is acquired by complicated experiment, which is inconvenient and has low accuracy. Therefore, design of a parameter adjusting method and a projector capable of automatically calibrating the projection image in accordance with the environmental light is an important issue in the optical design industry.

SUMMARY OF THE INVENTION

The present invention provides a parameter adjusting method and the projector capable of automatically calibrating a projection image according to an environmental light datum for solving above drawbacks.

According to the claimed invention, a parameter adjusting method is applied to a projector having an ambient light sensor, a database and a digital micromirror device. The parameter adjusting method includes analyzing a detection signal generated by the ambient light sensor to acquire an environmental light datum, comparing the environmental light datum with a lookup table of the database to compute at least one compensation parameter, and adjusting an amount of reflection light generated by the digital micromirror device in accordance with the at least one compensation parameter for controlling the projector to output a calibrated projection image compensated by the environmental light datum.

According to the claimed invention, the parameter adjusting method further includes selecting a key color, acquiring a base color parameter of the key color when environmental illumination of the projector is smaller than a threshold, measuring an original color parameter of the key color in response to the environmental light datum, and comparing the base color parameter with the original color parameter to establish the lookup table. Color gamut coordinates of the key color is set within a color gamut range of the original color parameter. The projector is located in a dark condition so that the environmental illumination is smaller than the threshold.

According to the claimed invention, a projector with a parameter adjusting function includes an ambient light sensor, a database, a digital micromirror device and an operation processor. The ambient light sensor is adapted to generate a detection signal for acquiring an environmental light datum. The database is adapted to store a lookup table. The operation processor is electrically connected to the ambient light sensor, the database and the digital micromirror device. The operation processor is adapted to compare the environmental light datum with the lookup table for computing at least one compensation parameter, and adjust an amount of reflection light generated by the digital micromirror device in accordance with the at least one compensation parameter for outputting a calibrated projection image compensated by the environmental light datum.

The parameter adjusting method and the projector of the present invention can establish the lookup table of the general light sources and a variety of specific environmental illumination for color gamut compensation in accordance with variation of the color coordinates of each key color from high saturation to low saturation, such as saturation sweeps; the present invention can easily and accurately calibrate the whole projection image by choosing a few saturation of the key color for adjustment. Further, the present invention can compare the environmental light datum of the ambient light sensor with the lookup table, for finding out the closest parameter via interpolation or other possible computation, and to control the amount of reflection light provided by the digital micromirror device for adjusting the white balance (such as WB or the color temperature), the hue, the saturation, the gain (such as intensity) and the gamma (such as a smooth degree from black color to white color) of the projection image, so that the original color parameter can be calibrated to be similar to or the same as the base color parameter. The parameter adjusting method and the projector of the present invention can effectively calibrate the projection image without increasing an intensity of the projection light source, and have advantages of energy economy, low working temperature, silent operation noise, cheap manufacturing cost and preferred color accuracy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
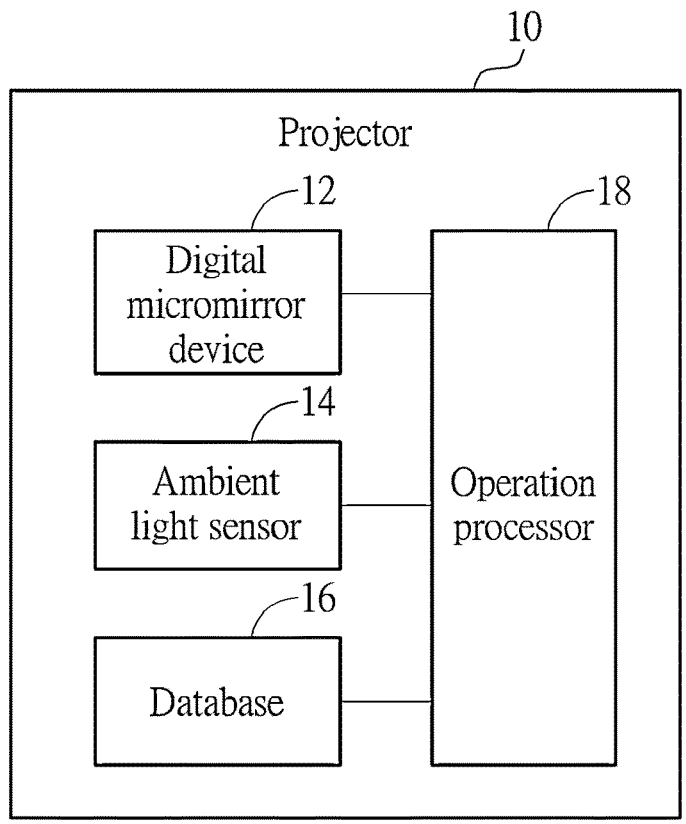
FIG. 1 is a diagram of a functional block diagram of a projector according to an embodiment of the present invention.

Please refer to FIG. 1. FIG. 1 is a diagram of a functional block diagram of a projector 10 according to an embodiment of the present invention. The projector 10 can include a digital micromirror device 12, an ambient light sensor 14, a database 16 and an operation processor 18. The ambient light sensor 14 can generate a detection signal to acquire an environmental light datum, such as analyzing intensity or other parameters of the detection signal to determine environmental illumination. The database 16 can store a lookup table, which may be predefined information inside the database 16, or may be update information computed in an operation period of the projector 10 and stored in the database 16. A source of the lookup table is not limited to the above-mentioned embodiments, which depends on a design demand. The operation processor 18 can be electrically connected to the digital micromirror device 12, the ambient light sensor 14 and the database 16. The projector 10 an have a parameter adjusting function; the operation processor 18 can automatically adjust an amount of reflection light generated by the digital micromirror device 12 in accordance with the environmental light datum around the projector 10, and therefore the projector 10 can provide projection images having the same or similar color intensity in a variety of the environmental illumination.

Figure 2:
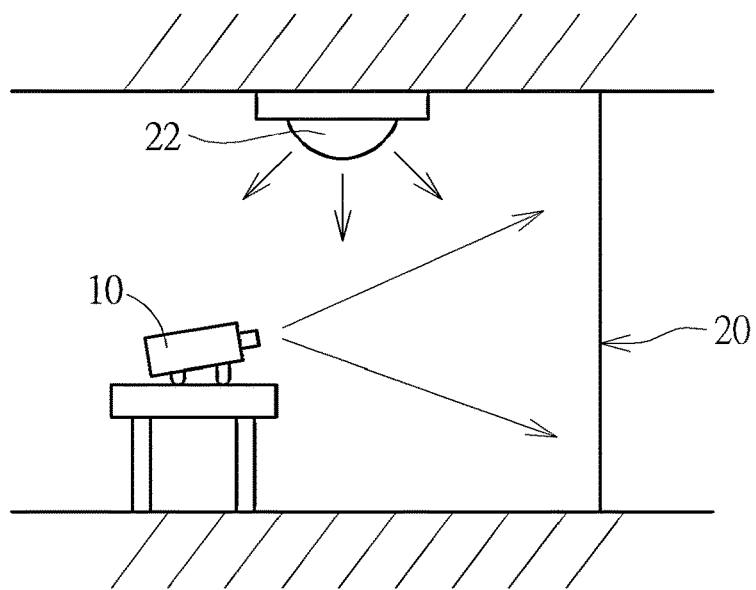
FIG. 2 is an assembly diagram of the projector according to the embodiment of the present invention.
Figure 3:
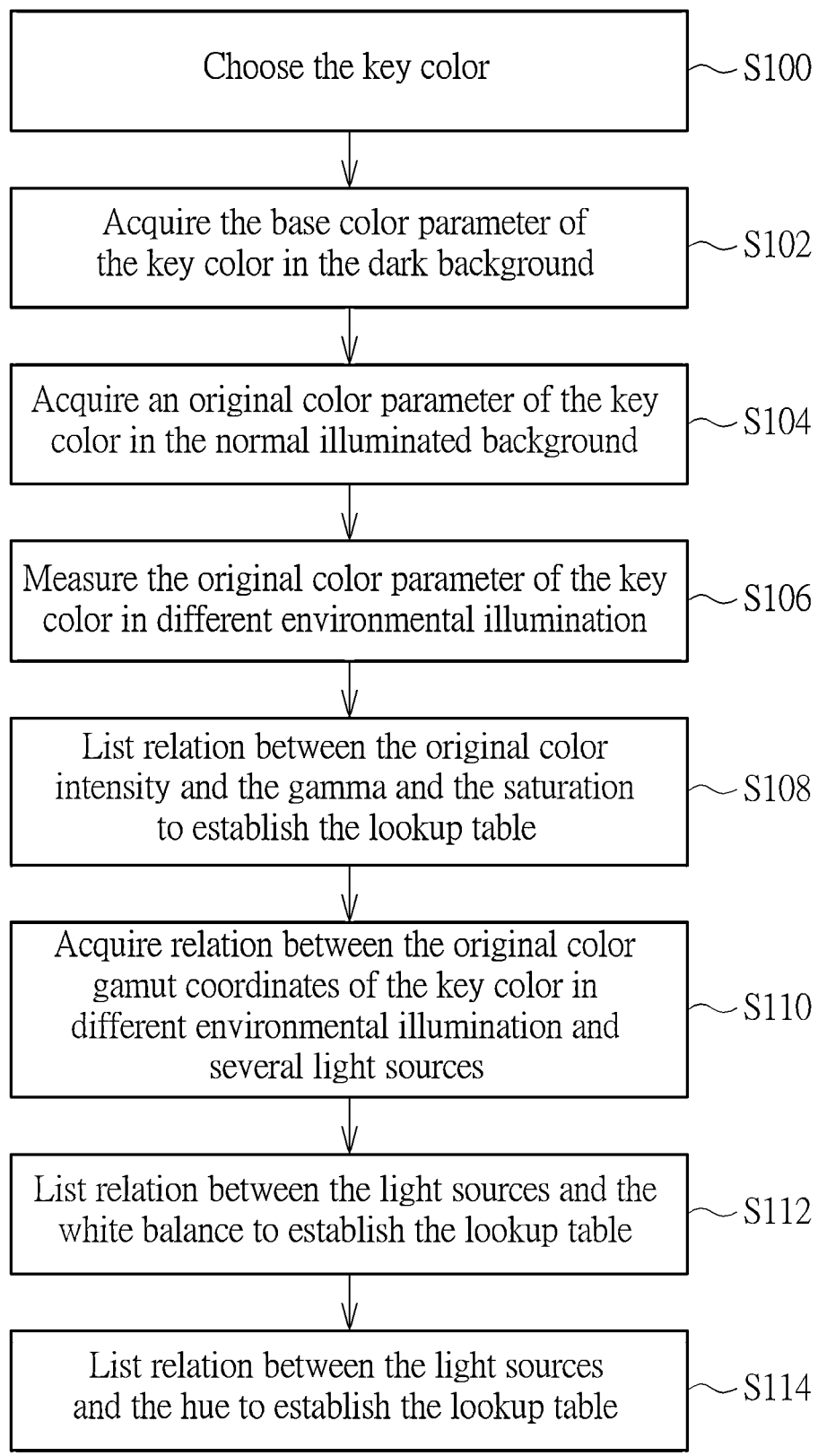
FIG. 3 is a flow chart of establishing a lookup table according to the embodiment of the present invention.
Figure 4:
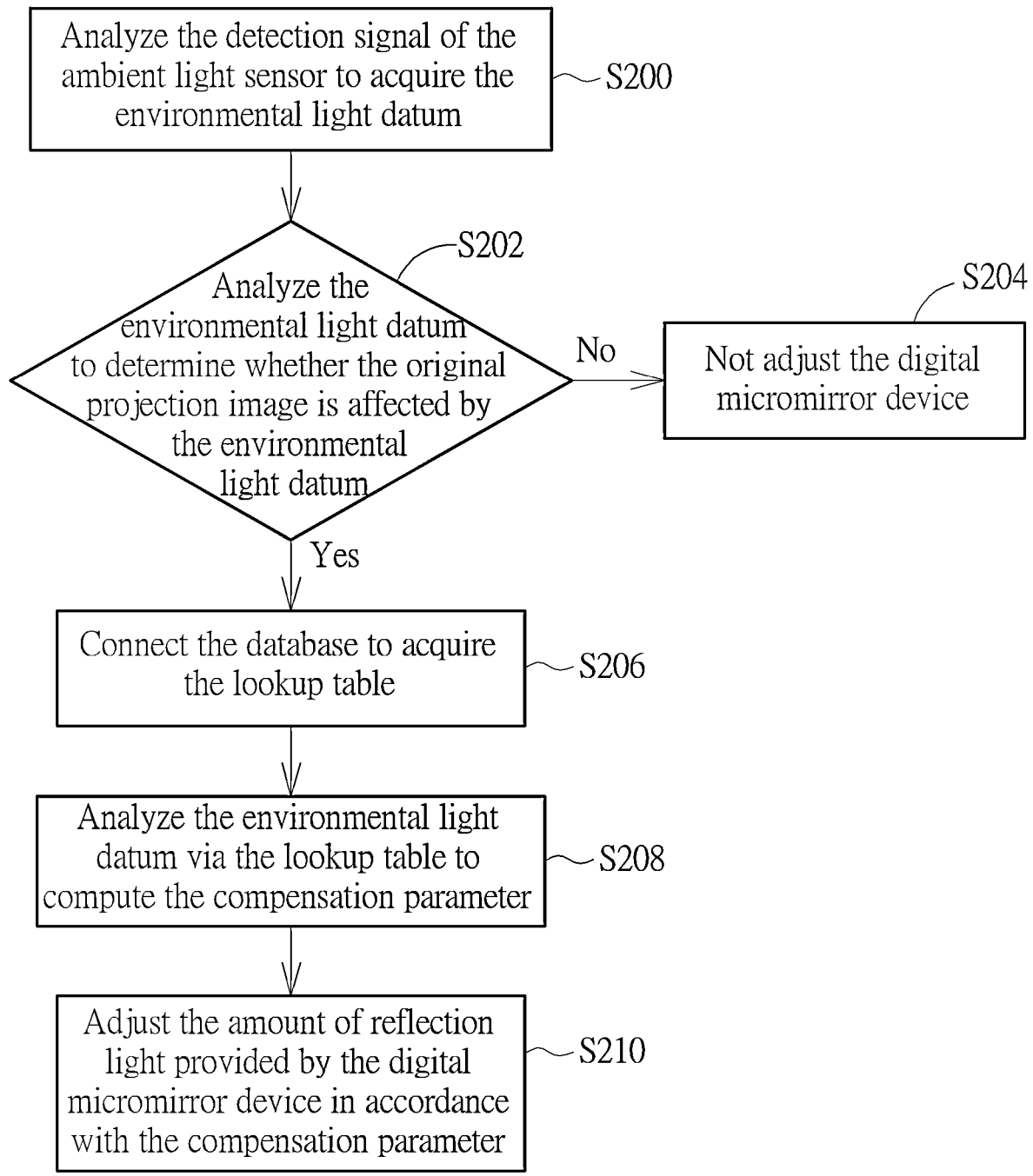
FIG. 4 is a diagram of a flow chart of a parameter adjusting method according to the embodiment of the present invention.
Figure 5:
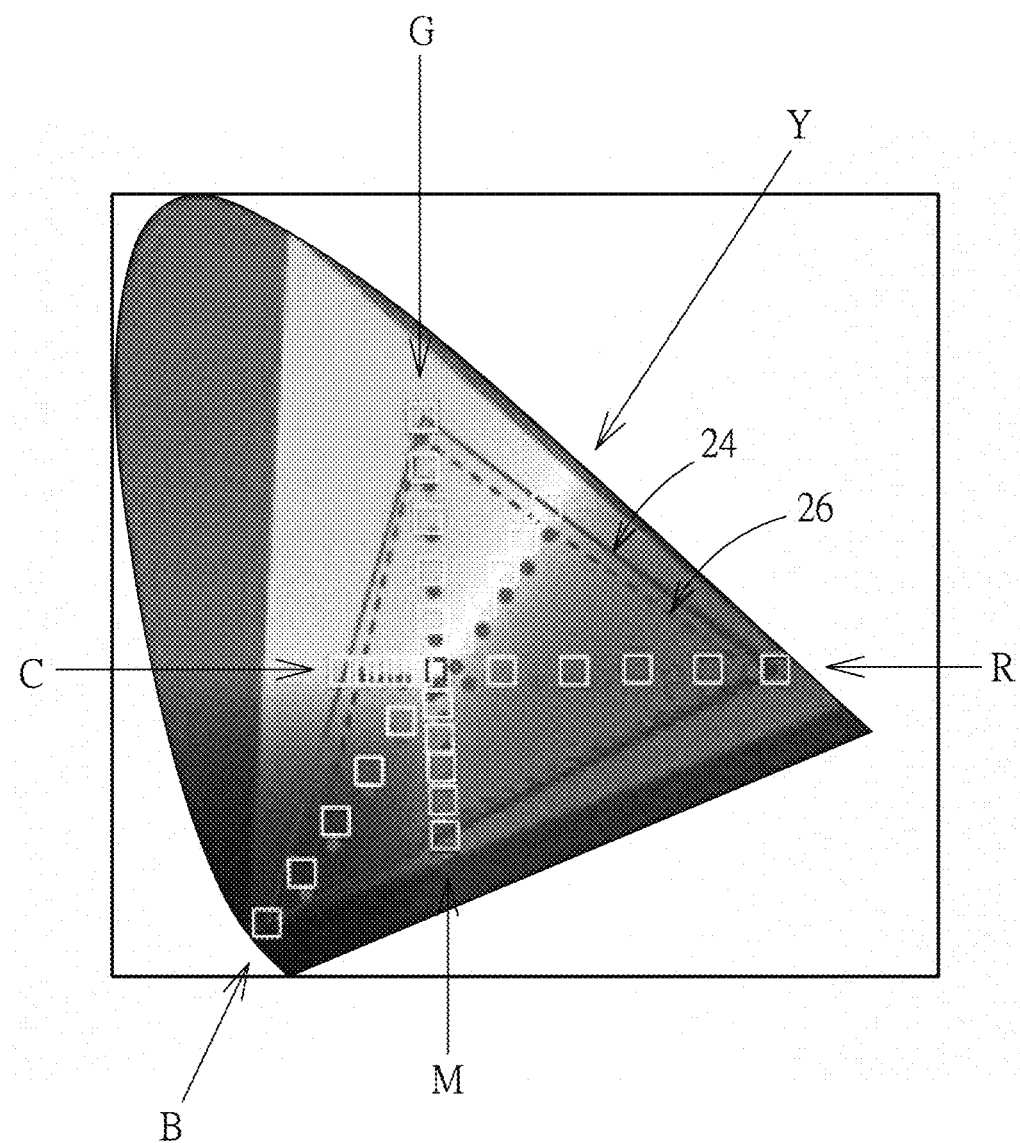
FIG. 5 is a diagram of color space showed by the parameter adjusting method according to the embodiment of the present invention.

Please refer to FIG. 2 to FIG. 5. FIG. 2 is an assembly diagram of the projector 10 according to the embodiment of the present invention. FIG. 3 is a flow chart of establishing the lookup table according to the embodiment of the present invention. FIG. 4 is a diagram of a flow chart of a parameter adjusting method according to the embodiment of the present invention. FIG. 5 is a diagram of color space showed by the parameter adjusting method according to the embodiment of the present invention. The projector 10 can project a projection image with plentiful color information onto a projection screen 20 in a dark background; however, the projector 10 may be used in some place with slight illumination in accordance with an actual demand, and a quality of the projection image is affected by the environmental light datum generated by an external light source 22. Thus, the parameter adjusting method of the present invention can automatically adjust white balance offset, hue offset, saturation offset, gain offset, and/or gamma offset of the projection image in accordance with the environmental light datum, so that the compensated projection image can provide preferred color performance.

For a method of establishing the lookup table, step S100 can be executed to choose a key color in the color space. Generally, the key color can be three primary color and CMY color model, such as Red (R), Green (G), Blue (B), Cyan (C), Magenta (M) and Yellow (Y). Then, steps S102 and S104 can be executed to acquire a base color parameter of the key color when environmental illumination around the projector 10 is smaller than a threshold, and measure an original color parameter of the key color in response to the environmental light datum. The base color parameter and the original color parameter can be defined as color coordinates of the key color in some specific saturation, such as a twenty percentage, a forty percentage, a sixty percentage, an eighty percentage and a hundred percentage of saturation. The number and difference of the saturation are not limited to the above-mentioned embodiment, which depends on an actual demand.

As shown in FIG. 5, when the projector 10 is in the dark condition, an original color gamut of the projection image can be represented as a solid triangle 24 in the color space, and the dark condition can be interpreted as the environmental illumination around the projector 10 is smaller than the threshold; if the projector 10 is in an illuminated condition, which means the environmental illumination around the projector 10 is equal to or greater than the threshold, the original color gamut of the projection image can be represented as a dotted triangle 26 in the color space. The color gamut coordinates of the key color can be set inside a color gamut range of the original color parameter, such as the range within the solid triangle 24 shown in FIG. 5; generally, the color coordinates of the key color which has the hundred percentage of saturation may be located outside the dotted triangle 26, so that the color coordinates having the hundred percentage of saturation may not be chosen. Selection of the key color and the base color parameter and the original color parameter is not limited to the above-mentioned embodiment, which depends on the actual demand.

Then, step S106 can be executed to acquire a plurality of original color intensity of each key color in several environmental light data. The present invention can predetermine a possible varied range of the environmental illumination, and set a plurality of illumination ranges within the possible varied range; for example, the present invention can preset the possible varied range of the environmental illumination being between 0~350 lux, and then divide the possible varied range into seven parts to acquire the plurality of illumination ranges; a difference between an upper limit and a lower limit of each illumination range may equal 50 lux. Then, step S108 can be executed to list relation between the plurality of original color intensity and the corresponding gamma values and the corresponding saturation values to establish the lookup table, such as the following table 1.

TABLE 1

| Environmental illumination | Gamma values | Saturation values |
|---|---|---|
| 0~50 | 0 | +0% |
| 50~100 | −0.1 | +3% |
| 100~150 | −0.2 | +6% |
| 150~200 | −0.4 | +9% |
| 200~250 | −0.6 | +12% |
| 250~300 | −0.8 | +15% |
| >350 | −1.0 | +18% |

Then, step S110 can be executed to acquire relation between the plurality of original color gamut coordinates (which means color temperature) of each key color in several environmental light data and a plurality of light sources; steps S112 and S114 can be continuously executed to list relation between the plurality of light sources and the corresponding white balance values and the corresponding hue values to establish the lookup table, such as the following table 2. It should be mentioned that the base color parameter and the original color parameter preferably can be at least one or two of the color intensity and the color gamut coordinates of the corresponding key color, so that table 1 and table 2 can be individually interpreted as the lookup table, or a combination of table 1 and table 2 can be interpreted as the lookup table for the parameter adjusting method.

TABLE 2

| Environmental color gamut coordinates | Light source | WB1 | WB2 | Hue |
|---|---|---|---|---|
| >5000K | D65 | 1 | 0.8 | −15 |
| 4000~5000K | Fluorescent | 0.8 | 0.9 | −5 |
| <4000K | Tungsten | 0.6 | 1.0 | 15 |

The established lookup table can be applied for the parameter adjusting method of the present invention. First, step S200 can be executed to analyze the detection signal generated by the ambient light sensor 14 to acquire the environmental light datum. Then, step S202 can be executed to analyze the environmental light datum for determining whether an original projection image of the projector 10 is affected by the environmental light datum. If the original projection image is not affected by the environmental light datum, the projector 10 may be in the low environmental illumination, or a light source of the projector 10 may be unaffected due to high intensity, so that step S204 can be executed to not adjust the amount of reflection light provided by the digital micromirror device 12. If the original projection image is affected by the environmental light datum, which means the environmental illumination is greater than a predefined intensity threshold, or a ratio of the environmental illumination to an intensity of the light source is greater than the predefined intensity threshold, steps S206 and S208 can be executed to connecting the database 16 for acquiring the lookup table, and analyze the environmental light datum via the lookup table for computing a compensation parameter. Final, step S210 can be executed to adjust the amount of reflection light provided by the digital micromirror device 12 in accordance with the compensation parameter, so as to control the projector 10 to output a calibrated projection image compensated by the environmental light datum.

As shown in FIG. 5, when the environmental illumination around the projector 10 is greater than or equal to the threshold, the color coordinates of each key color, such as Red (R), Green (G), Blue (B), Cyan (C), Magenta (M) and Yellow (Y), can have several saturation respectively being represented as circular marks in the color space, and all the circular marks are stayed inside the dotted triangle 26; when the amount of reflection light provided by the digital micromirror device 12 is adjusted via the parameter adjusting method of the present invention, the color coordinates of each key color which have several saturation can be respectively calibrated and represented as rectangular marks in the color space, which means the key color having different saturation can be calibrated to positions close to the solid triangle 24, so that the projector 10 stayed in the high environmental illumination can provide the projection image performed similar to or the same as the projection image provided by the projector 10 in the low environmental illumination.

In conclusion, the parameter adjusting method and the projector of the present invention can establish the lookup table of the general light sources and a variety of specific environmental illumination for color gamut compensation in accordance with variation of the color coordinates of each key color from high saturation to low saturation, such as saturation sweeps; the present invention can easily and accurately calibrate the whole projection image by choosing a few saturation of the key color for adjustment. Further, the present invention can compare the environmental light datum of the ambient light sensor with the lookup table, for finding out the closest parameter via interpolation or other possible computation, and to control the amount of reflection light provided by the digital micromirror device for adjusting the white balance (such as WB or the color temperature), the hue, the saturation, the gain (such as intensity) and the gamma (such as a smooth degree from black color to white color) of the projection image, so that the original color parameter can be calibrated to be similar to or the same as the base color parameter. Comparing to the prior art, the parameter adjusting method and the projector of the present invention can effectively calibrate the projection image without increasing an intensity of the projection light source, and have advantages of energy economy, low working temperature, silent operation noise, cheap manufacturing cost and preferred color accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A parameter adjusting method applied to a projector having an ambient light sensor, a database and a digital micromirror device, the parameter adjusting method comprising:
   analyzing a detection signal generated by the ambient light sensor to acquire an environmental light datum;
   comparing the environmental light datum with a lookup table of the database to compute at least one compensation parameter; and
   adjusting an amount of reflection light generated by the digital micromirror device in accordance with the at least one compensation parameter for controlling the projector to output a calibrated projection image compensated by the environmental light datum.

2. The parameter adjusting method of claim 1, further comprising:
   selecting a key color;
   acquiring a base color parameter of the key color when environmental illumination around the projector is smaller than a threshold;
   measuring an original color parameter of the key color in response to the environmental light datum; and
   comparing the base color parameter with the original color parameter to establish the lookup table.

3. The parameter adjusting method of claim 2, wherein color gamut coordinates of the key color is set within a color gamut range of the original color parameter.

4. The parameter adjusting method of claim 2, wherein the projector is located in a dark condition so that the environmental illumination is smaller than the threshold.

5. The parameter adjusting method of claim 2, wherein the base color parameter and the original color parameter individually comprises at least one of color gamut coordinates and a color intensity of the key color.

6. The parameter adjusting method of claim 2, further comprising:
   acquiring a plurality of original color intensity of the key color in several environmental light data; and
   listing relation between the plurality of original color intensity and corresponding gamma values to establish the lookup table.

7. The parameter adjusting method of claim 2, further comprising:
   acquiring a plurality of original color intensity of the key color in several environmental light data; and listing relation between the plurality of original color intensity and corresponding saturation values to establish the lookup table.

8. The parameter adjusting method of claim 2, further comprising:
acquiring relation between a plurality of original color gamut coordinates of the key color in several environmental light data and corresponding light sources.

9. The parameter adjusting method of claim 8, further comprising:
listing relation between the foresaid light sources and corresponding white balance values to establish the lookup table.

10. The parameter adjusting method of claim 8, further comprising:
listing relation between the foresaid light sources and corresponding hue values to establish the lookup table.

11. The parameter adjusting method of claim 1, further comprising:
analyzing the environmental light datum to determine whether an original projection image of the projector is affected by the environmental light datum; and
connecting the database to compare the environmental light datum with the lookup table when the original projection image is affected by the environmental light datum.

12. A projector with a parameter adjusting function, comprising:
an ambient light sensor adapted to generate a detection signal for acquiring an environmental light datum;
a database adapted to store a lookup table;
a digital micromirror device; and
an operation processor electrically connected to the ambient light sensor, the database and the digital micromirror device, the operation processor being adapted to compare the environmental light datum with the lookup table for computing at least one compensation parameter, and adjust an amount of reflection light generated by the digital micromirror device in accordance with the at least one compensation parameter for outputting a calibrated projection image compensated by the environmental light datum.

13. The projector of claim 12, wherein the operation processor is further adapted to select a key color, acquire a base color parameter of the key color when environmental illumination around the projector is smaller than a threshold, measure an original color parameter of the key color in response to the environmental light datum, and compare the base color parameter with the original color parameter to establish the lookup table.

14. The projector of claim 13, wherein color gamut coordinates of the key color is set within a color gamut range of the original color parameter.

15. The projector of claim 13, wherein the projector is located in a dark condition so that the environmental illumination is smaller than the threshold.

16. The projector of claim 13, wherein the base color parameter and the original color parameter individually comprises at least one of color gamut coordinates and a color intensity of the key color.

17. The projector of claim 13, wherein the operation processor is further adapted to acquire a plurality of original color intensity of the key color in several environmental light data, and list relation between the plurality of original color intensity and corresponding gamma values to establish the lookup table, or list relation between the plurality of original color intensity and corresponding saturation values to establish the lookup table.

18. The projector of claim 13, wherein the operation processor is further adapted to acquire relation between a plurality of original color gamut coordinates of the key color in several environmental light data and corresponding light sources.

19. The projector of claim 18, wherein the operation processor is further adapted to list relation between the foresaid light sources and corresponding white balance values to establish the lookup table, or list relation between the foresaid light sources and corresponding hue values to establish the lookup table.

20. The projector of claim 12, wherein the operation processor is further adapted to analyze the environmental light datum to determine whether an original projection image of the projector is affected by the environmental light datum, and connect the database to compare the environmental light datum with the lookup table when the original projection image is affected by the environmental light datum.

* * * * *